US010984373B2

(12) United States Patent
Shintani

(10) Patent No.: US 10,984,373 B2
(45) Date of Patent: Apr. 20, 2021

(54) SYSTEM AND METHOD FOR INFORMATION PROCESSING

(71) Applicant: SONY CORPORATION, Tokyo (JP)

(72) Inventor: Peter Shintani, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 496 days.

(21) Appl. No.: 15/062,923

(22) Filed: Mar. 7, 2016

(65) Prior Publication Data

US 2017/0255651 A1   Sep. 7, 2017

(51) Int. Cl.
*G06F 7/00* (2006.01)
*G06Q 10/08* (2012.01)

(52) U.S. Cl.
CPC ................. *G06Q 10/087* (2013.01)

(58) Field of Classification Search
CPC ......... G06F 17/30256; G06F 17/30268; G06F 17/30554
USPC .......................................... 707/737
See application file for complete search history.

(56) References Cited

U.S. PATENT DOCUMENTS

| 5,671,362 | A | | 9/1997 | Cowe et al. | |
|---|---|---|---|---|---|
| 5,943,093 | A | * | 8/1999 | Anderson | H04N 1/32101 348/231.6 |
| 5,953,234 | A | * | 9/1999 | Singer | B65G 1/0485 414/789.6 |
| 6,538,698 | B1 | * | 3/2003 | Anderson | H04N 5/772 348/231.2 |
| 6,549,891 | B1 | * | 4/2003 | Rauber | G06Q 10/08 705/22 |
| 6,914,625 | B1 | * | 7/2005 | Anderson | H04N 1/2112 348/222.1 |
| 7,747,342 | B2 | | 6/2010 | Glynn | |
| 8,189,855 | B2 | | 5/2012 | Opalach et al. | |
| 8,194,985 | B2 | | 6/2012 | Grigsby | |

(Continued)

FOREIGN PATENT DOCUMENTS

| CN | 1787003 A | 6/2006 |
|---|---|---|
| CN | 101149792 A | 3/2008 |

(Continued)

OTHER PUBLICATIONS

Ahmed Zaafouri et al, "A Vision Approach for Expiry Date Recognition Using Stretched Gabor Features", Sep. 2015, pp. 448-445, vol. 12, No. 5, The International Arab Journal of Information Technology.

(Continued)

*Primary Examiner* — Pavan Mamillapalli
(74) *Attorney, Agent, or Firm* — Chip Law Group

(57) ABSTRACT

Various aspects of a system and method for information processing are disclosed herein. The method includes capturing a set of images associated with an item by a first electric device. The set of images comprises one or more images of the item and/or an associated location where the item is stored. A user input that corresponds to the captured set of images associated with the item is received. A first set of information is extracted from the captured set of images and the received user input. The extracted first set of information is communicated to the server. A second set of information associated with the item is retrieved by the server from the extracted first set of information in response to a query received from a second electronic device.

17 Claims, 8 Drawing Sheets

(56) References Cited

U.S. PATENT DOCUMENTS

| | | | |
|---|---|---|---|
| 8,438,084 B1* | 5/2013 | Tesler | G06Q 10/087 |
| | | | 705/29 |
| 8,447,665 B1* | 5/2013 | Schoenharl | G06Q 10/087 |
| | | | 705/28 |
| 9,268,858 B1* | 2/2016 | Yacoub | G06F 16/248 |
| 9,626,709 B2* | 4/2017 | Koch | G06K 9/00671 |
| 9,731,895 B2* | 8/2017 | Manning | B65G 1/045 |
| 9,773,023 B2* | 9/2017 | Iorio | G06F 16/5866 |
| 2006/0178776 A1* | 8/2006 | Feingold | G16H 40/63 |
| | | | 700/245 |
| 2007/0005571 A1 | 1/2007 | Brewer et al. | |
| 2007/0102515 A1* | 5/2007 | Windham | G06K 1/121 |
| | | | 235/385 |
| 2008/0059384 A1* | 3/2008 | Eglen | G06Q 30/0283 |
| | | | 705/400 |
| 2008/0082426 A1* | 4/2008 | Gokturk | G06F 17/30256 |
| | | | 705/26.62 |
| 2008/0152231 A1* | 6/2008 | Gokturk | G06Q 30/08 |
| | | | 382/209 |
| 2011/0153403 A1* | 6/2011 | Postrel | G06Q 30/02 |
| | | | 705/14.29 |
| 2011/0251882 A1* | 10/2011 | Richard | G06Q 30/02 |
| | | | 705/14.25 |
| 2012/0271705 A1* | 10/2012 | Postrel | G06Q 20/201 |
| | | | 705/14.33 |
| 2013/0282522 A1* | 10/2013 | Hassan | G06Q 10/087 |
| | | | 705/26.9 |
| 2013/0332291 A1* | 12/2013 | Perez | G06Q 30/0623 |
| | | | 705/14.73 |
| 2014/0003727 A1 | 1/2014 | Lortz et al. | |
| 2014/0007183 A1* | 1/2014 | Qureshi | G06F 21/10 |
| | | | 726/1 |
| 2014/0278998 A1* | 9/2014 | Systrom | G06Q 30/0277 |
| | | | 705/14.57 |
| 2015/0058409 A1* | 2/2015 | Wang | H04L 12/2838 |
| | | | 709/203 |
| 2015/0287117 A1 | 10/2015 | Tan | |
| 2017/0103419 A1* | 4/2017 | Gibson | G06Q 30/0267 |

FOREIGN PATENT DOCUMENTS

| | | |
|---|---|---|
| CN | 101535986 A | 9/2009 |
| CN | 101938619 A | 1/2011 |
| CN | 102760144 A | 10/2012 |
| CN | 104504155 A | 4/2015 |
| CN | 104778170 A | 7/2015 |

OTHER PUBLICATIONS

Office Action for CN Patent Application No. 201710077074.9, dated Apr. 1, 2020, 18 pages of Office Action and 17 pages of English Translation.

* cited by examiner

US 10,984,373 B2

SYSTEM AND METHOD FOR INFORMATION PROCESSING

CROSS-REFERENCE TO RELATED APPLICATIONS/INCORPORATION BY REFERENCE

None.

FIELD

Various embodiments of the disclosure relate to a system and method for information processing. More specifically, various embodiments of the disclosure relate to a system and method for information processing to catalog and organize physical items.

BACKGROUND

With recent advancements in the field of information processing, several inventory management applications have been introduced. Mostly, such inventory management applications are implemented in commercial establishments, such as a mall or a grocery store. Typically, such inventory management applications are included in a central server that may store metadata associated with various items, provided by a user by use of an electronic device. Thereafter, a query may be generated by another electronic device associated with another user, and communicated to the server. In response to the query, the server may retrieve stored metadata and communicate to the other electronic device for display. For example, the query may include an image of an item, such as a beverage can, captured via an electronic device, such as a smartphone. In response to the query, the server may retrieve associated metadata, such as calories in the beverage, and communicate the retrieved metadata to the electronic device. However, such inventory management applications may not be effective for non-commercial purposes, as the user may find it tedious to maintain a catalog about a location where the items are stored. Thus, it may be desirable by the user to have such an application by which random items may be suitably cataloged and organized, so that the metadata may be utilized for other purposes as well.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for information processing are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
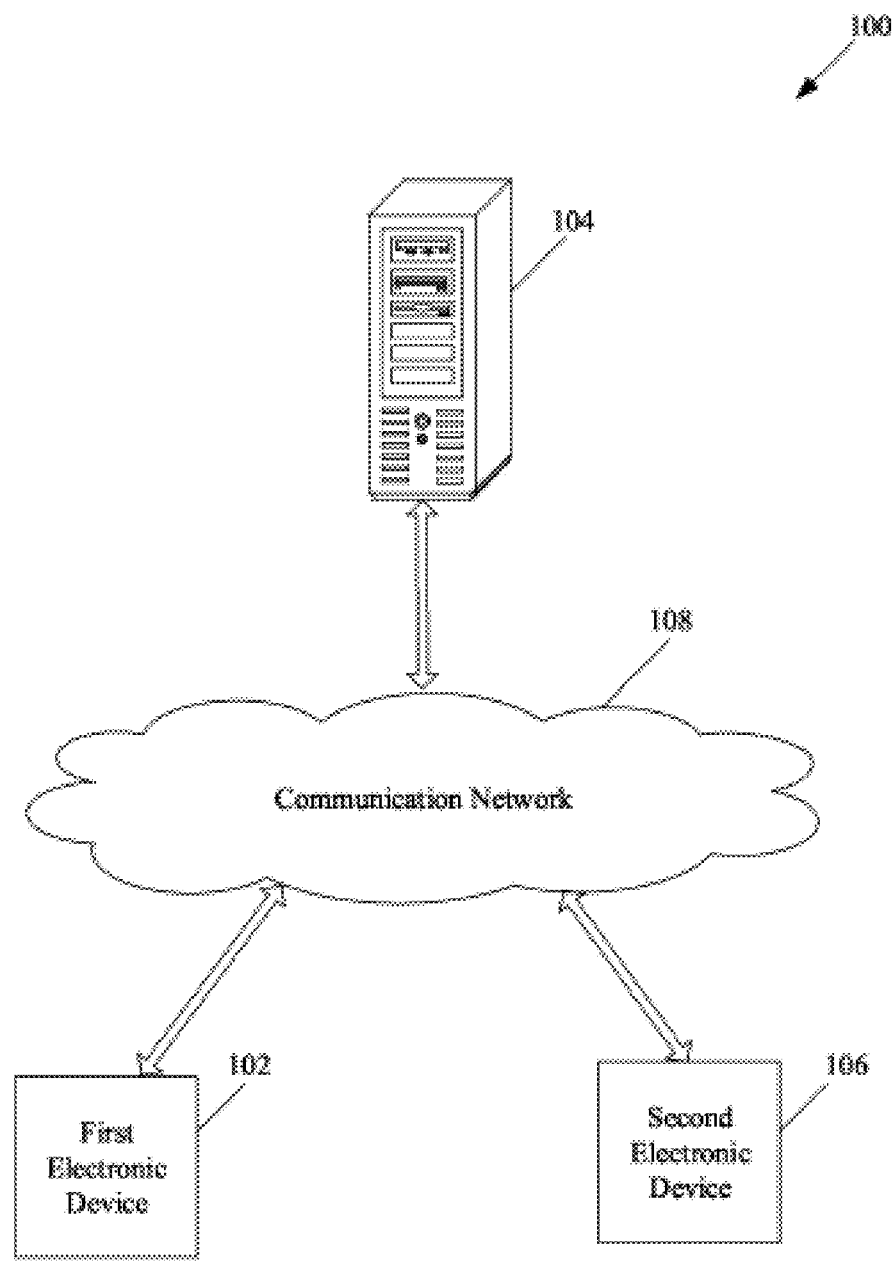
FIG. 1 is a block diagram that illustrates a network environment for information processing, in accordance with an embodiment of the disclosure.

The following described implementations may be found in the disclosed system and method for information processing. Exemplary aspects of the disclosure may include a method implemented in a first electronic device. A set of images associated with an item may be captured by the first electronic device. The set of images may comprise one or more images of the item and/or an associated location where the item may be stored. A user input that corresponds to the captured set of images associated with the item may be received. A first set of information may be extracted from the captured set of images associated with the item and the received user input. The extracted first set of information associated with the item may be communicated to the server. In accordance with an embodiment, a second set of information associated with the item may be retrieved by the server from the extracted first set of information, in response to a query received from a second electronic device.

In accordance with an embodiment, the method may further include generation of tagging information for each image of the captured set of images associated with the item. The generated tagging information may comprise one or more of a date and a time when the set of images is captured, geospatial metadata associated with the item and an enclosure where the item is stored, and/or other encoded information associated with the captured set of images. In accordance with an embodiment, the first set of information may comprise tagging information for the set of images associated with the item.

In accordance with an embodiment, the received user input may correspond to information related to the item in addition to the extracted first set of information. The first electronic device and the second electronic device may correspond to one of a smart phone, a tablet computing device, a barcode reader, and/or a quick response (QR) reader.

In accordance with an embodiment, the set of images captioned by the first electronic device may comprise one or more images of the item and/or an associated location where the item is stored. The extracted first set of information may correspond to one or more of a name of the item, a type of the item, an expiry date of the item, a maximum retail price of the item, one or more ingredients of the item, a manufacturing date of the item, a name of manufacturing company of the item, one or more statutory warnings, instructions for safe usage of the item, a universal product code (UPC), a material safety data sheet (MSDS), and/or other related information of the item retrieved from a plurality of data sources. In accordance with an embodiment, the determined second set of information may correspond to one or more of time left for expiry of the item, a shelf life of the item, a due date for recycling, quality information of ingredients of the item, and/or a current optimum price value of the item.

In accordance with another embodiment of the disclosure, the method may be implemented in a server. The method may include receipt of a first set of information associated with an item from a first electronic device. The first set of information may be extracted from set of images associated with the item captured by the first electronic device and a user input. A second set of information may be determined from the received first set of information associated with the item. A query associated with the item may be received from a second electronic device. The first set of information and/or the determined second set of information may be retrieved, based on the received query. The retrieved first set of information and/or the retrieved second set of information may be transmitted to the second electronic device.

In accordance with another embodiment of the disclosure, the method may be implemented in a second electronic device. The method may include receipt of a query associated with an item. The query may comprise text and/or image-based content associated with the item. The received query may be transmitted to the server to retrieve a first set of information and/or a second set of information. The first set of information may be received from the first electronic device. The second set of information may be determined by the server from the received first set of information. The method further includes receipt of the retrieved first set of information and/or the retrieved second set of information from the server.

In accordance with yet another embodiment of the disclosure, a server may be configured to receive a first set of information associated with an item from a first electronic device. The first set of information may correspond to sensor data received from the first electronic device, and/or a user input. A second set of information from the received first set of information associated with the item, may be determined.

In accordance with an embodiment, a database may be generated based on the first set of information and/or the determined second set of information. A query associated with the item may be received from the second electronic device. The first set of information and/or the determined second set of information, may be retrieved based on the received query. The retrieved first set of information and/or the retrieved second set of information may be transmitted to the second electronic device.

In accordance with an embodiment, the sensor data received from the first electronic device may correspond to a location data of the first electronic device obtained from an indoor positioning system, a geospatial sensor, and/or other sensors associated with the first electronic device. The sensor data received from the first electronic device may further correspond to an orientation data of the first electronic device, and/or a set of images associated with the item captured by the first electronic device. In accordance with an embodiment, a grouping may be performed for the item with one or more of a plurality of other items. The grouping may be based on other first set of information associated with each of the plurality of other items and the received first set of information associated with the item.

FIG. 1 is a block diagram that illustrates a network environment for the information processing, in accordance with an embodiment of the disclosure. With reference to FIG. 1, there is shown a network environment 100. The network environment 100 may include a first electronic device 102, a server 104, a second electronic device 106, and a communication network 108. The first electronic device 102 and the second electronic device 106 may be communicatively coupled to the server 104, via the communication network 108.

The first electronic device 102 may comprise suitable logic, circuitry, interfaces, and/or code that may be configured to capture a set of images associated with an item. The first electronic device 102 may be further configured to extract a first set of information associated with the item. The first electronic device 102 may be further configured to communicate the extracted first set of information associated with the item to the server 104, via the communication network 108. Examples of the first electronic device 102 may include, but are not linked to, a smart phone, a digital camera, a tablet computing device, a barcode reader, a Quick Response (QR) reader, Magnetic Ink Character Recognition Code (MICR Code) scanner, and/or a Radio Frequency Identification (RFID) reader.

The server 104 may comprise suitable logic, circuitry, interfaces, and/or code that may be configured to provide information processing services to one or more subscribed electronic devices, such as the first electronic device 102 and/or the second electronic device 106. The server 104 may be further configured to determine a second set of information from the first set of information received from the first electronic device 102. In accordance with an embodiment, the sever 104 may be implemented as a plurality of cloud-based resources by use of several technologies that are well known to those skilled in the art. Further, the server 104 may be associated with a single or multiple service providers. Examples of the one or more servers may include, but are not limited to, Apache™, HTTP Server, Microsoft® Internet Information Services (IIS), IBM® Application Server, Sun Java™ System Web Server, and/or a file server.

A person with ordinary skill in the art will understand that the scope of the disclosure is not limited to implementation of the server 104 and the first electronic device 102 as separate entities. In accordance with an embodiment, the functionalities of the server 104 may be implemented in the first electronic device 102, without departure from the scope of the disclosure.

The second electronic device 106 may comprise suitable logic, circuitry, interfaces, and/or code that may be configured to receive the query that corresponds to the item. The second electronic device 106 may be further configured to receive the first set of information and/or the second set of information from the server 104, based on the transmitted query. Examples of the second electronic device 106 may be similar to the examples of the first electronic device 102, as described above.

The communication network 108 may include a medium through which the first electronic device 102 and/or the second electronic device 106 may communicate with one or more servers, such as the server 104. Examples of the communication network 108 may include, but are not limited to, the Internet, a cloud network, a Long Term Evolution (LTE) network, a Wireless Fidelity (Wi-Fi) network, a Wireless Local Area Network (WLAN), a Local Area Network (LAN), a plain old telephone service (POTS), and/or a Metropolitan Area Network (MAN). Various devices in the network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

In operation, a user, such as a first user, may perform an action, such as a hardware or software button press, at the first electronic device 102. Based on the action, the first electronic device 102 may be activated to capture a set of images associated with an item. The item may correspond to a tangible thing that belongs to the user. The set of images may comprise one or more images of the item that may provide information about the item. For example, the one or more images may correspond to a label of a medicine that may provide information, such as chemical composition of the medicine, manufacturing date, expiry date, statutory warnings, and/or the like. The set of images may further correspond to an associated location where the item may be stored. The location may be a shelf enclosure, an area in a room, a container or a bag that holds the item, and/or the like. In accordance with an embodiment, the first user may further provide a user input for one or more images from the captured set of images. The user input may correspond to additional information associated with the item, such as name of the store from where the medicine is bought.

The first electronic device 102 may be further configured to generate tagging information for the captured set of images associated with the item. Examples of the tagging information may include, but are not limited to, a date and a time when the set of images is captured, geospatial metadata associated with the item and/or a location where the item is stored, and/or other encoded information associated with the captured set of images.

In accordance with an embodiment, the first electronic device 102 may be configured to extract a first set of information associated with the item from the captured set of mages. The extracted first set of information may correspond to name of the item, a type of the item, an expiry date of the item, and/or the like. The first electronic device 102 may be further configured to communicate the extracted first set of information associated with the item to the server 104, via the communication network 108.

In accordance with an embodiment, the server 104 may be configured to receive the first set of information associated with an item from the first electronic device 102. The server 104 may be further configured to store the received first set of information in a secondary stage unit and/or storage elements. In accordance with an embodiment, the server may be configured to generate a database based on the received first set of information associated with various items from the first electronic device 102. In accordance with an embodiment, a database with pre-defined data structure, may be pre-stored at the server 104. In such an embodiment, the received first set of information associated with various items from the first electronic device 102, may be dynamically updated in the database. In accordance with an embodiment, the first set of information may include the user input associated with one or more images of the captured set of images. In accordance with an embodiment, the received first set of information may include the tagging information associated with the item. The first set of information may be received at the server 104 in response to one or more commands provided by the user, via an application user interface (UI) rendered at the display of the first electronic device 102. In accordance with an embodiment, sensor data may be received from the first electronic device 102 with may correspond to a location data of the first electronic device 102 obtained from an indoor positioning system, a geospatial sensor, and/or other sensors associated with the first electronic device 102. The sensor data received from the first electronic device 102 may further correspond to an orientation data of the first electronic device 102 and/or a set of images associated with the item captured by the first electronic device 102.

The server 104 be configured to generate a label for each item for which the first set of information mat be received from the first electronic device 102, by use of the application UI. The label for each item may provide product information of the item, and other information associated with each item. The generated label for various items for which the first set of information is received, may be used to group similar items. In accordance with an embodiment, the grouping of similar items may be based on the received first set of information. For example, paint, brushes, pain-thinner, drop-cloth, and all paint related items or containers may be grouped as similar items. Lighting items, such as light bulbs, Christmas decorative lamps, torch lights, and the like may be grouped as similar items. Similarly, screw driver, screws, nuts, bolts may be grouped as similar items. The grouping of similar items may be performed dynamically based on the receipt of the first set information. Such labeled and grouped items may then be searchable in the database from a remote device, such as the first electronic device 102, by use of the application UI. Further, such labeling and grouping of the similar items, may enable quick and accurate retrieval of relevant information from the database.

In accordance with an embodiment, the label and the grouping of the similar items, may be updated or changed based on user input, such as by use of the application UI at the first electronic device 102. The changes or updates may be communicated to the server 104 to further update the generated database. In accordance with an embodiment, the server 104 may be further configured to determine a second set of information from the received first set of information. The determined second set of information may also be updated in the generated database stored in a secondary storage unit and/or other storage elements. The determined second set of information may correspond to information derived from the first set of information. Examples of the second set of information may include, but are not limited to, time left for expiry of the item, a shelf life of the item, and/or a due date for recycling.

The server 104 may be further configured to receive a query associated with the item from the second electronic device 106, via the communication network 108. In accordance with an embodiment, the query may be provided by another user, such as a second user, via the application UI rendered at the second electronic device 106. In accordance with an embodiment, the received query may comprise text-based and/or image-based content associated with the item. The query may correspond to retrieval of the first set of information and/or the second set of information from the server 104.

In response to the received query, the server 104 may be configured to retrieve the stored first set of information and the second set of information from the secondary storage unit and/or other storage elements. Further, the server 104 may be configured to transmit the retrieved first set of information and/or the second set of information to the second electronic device 106, via the communication network 108.

In accordance with an embodiment, the server 104 may be configured to generate an alert message that corresponds to the received first set of information and/or the determined second set of information associated with the item. In accordance with an embodiment, the server 104 may be further configured to automatically communicate the generated alert message to the first electronic device 102 and/or the second electronic device 106. For example, the alert message may be "The item is dangerous and should be kept away from other items", "The item is going to expire on Dec. 20, 2016", and/or the like. In accordance with an embodiment, the information related to an item may be displayed at the first electronic device 102 via the application UI, in simplified and hierarchical manner. For example, first displayed information may be a label for the queried item comprising basic product information of the item based on the first set of information. When the user is interested to know more about the item, the user may provide an input via the application UI. Accordingly, other associated information, such as the second set of information, grouping information, last queried date and time, may be presented.

A person ordinary skilled in the art will understand that the retrieval of the first and/or the second set of information by the second user associated with the second electronic device 106 is described herein, as an example. In accordance with another example, the first and/or the second set of information may be retrieved by the second user by use of the first electronic device 102. In accordance with yet another example, the first and/or the second set of information may be retrieved by the first user by use of the first electronic device 102.

Notwithstanding, the scope of the disclosure may not be limited to the above examples, and may also be applicable to a new user to the network environment 100. In an exemplary scenario, the new user, such as an insurance agent, with a new electronic device may enter a new location, such as home of the first user. The new user may not be acquainted with the new location, and may design to enquire about one or more items at the new location. In such an exemplary scenario, the disclosed system provides a technological platform where the new user may receive the desired information about the one or more items without any assistance from the first user. For this, a UI (similar to the application UI) may be either pre-installed at the new electronic device or may be automatically installed when the new device enters a proximity range of the available home network, such as the communication network 108, at the new location. Thereafter, the UI may be used to capture a photograph of an item for which information is desired. The captured photograph may be transmitted to the server 104 as a query, based on which the server 104 may retrieve first and/or second set of information related to the item. Subsequently, the retrieved first and/or second set of information may be communicated to the new electronic device and rendered on the UI. In accordance with an embodiment, alternatively, location information and/or orientation information of the new electronic device with or without captured photograph may be transmitted to the server 104 as a query. The location information and/or orientation information may be derived from the one or more sensors at the new electronic device or based on various indoor positioning systems, known in the art.

In another exemplary scenario, the new user, such as an income tax officer, with the new electronic device may capture a photograph of a container in which the item, along with other items is stored. The photograph may be captured via the pre-installed or installed on-the-go UI, similar to the device UI, as explained above. The user, such as the first user, may intend to donate the container to charity. Based on the details and location of the container, the sever 104 may retrieve the first and/or the second set of information associated with the items in the container, and communicate to the new electronic device. In accordance with an embodiment, the server 104 may utilize the generated database to identify the items in the container. A label may be printed with or without images with a description of the items in the container. An overall grouping or category, which may represent the items in the container, may also be presented to the new electronic device. The new user, based on the received first and/or the second set of information, may determine required information, such as tax rebate.

Thus, the disclosed system provides an advanced technological platform where the user, such as the first user, maintains a catalog about a location where the item is stored and another user, such as the second user or the new user, may retrieve first and/or second set of information associated with the item without any human assistance from the user, in a simplified manner. The catalog may be generated and maintained based on the label associated with each item. Thus, the disclosed system may enable the other user to become not only self-reliant at the new location but gain advanced information for a specific purpose.

Figure 2A:
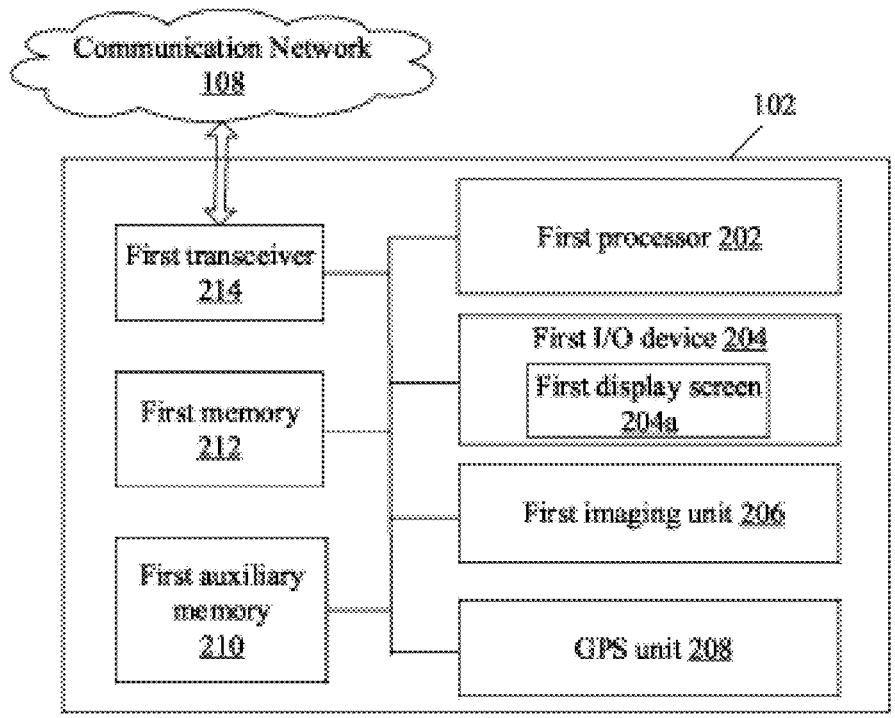
FIG. 2A illustrates a first diagram of an exemplary first electronic device for information processing, in accordance with an embodiment of the disclosure.

FIG. 2A illustrates a first block diagram of an exemplary first electronic device for information processing, in accordance with an embodiment of the disclosure. With reference to FIG. 2A, there is shown the first electronic device 102 that may include a first processor 202, a first I/O device 204, a first imaging unit 206, a Global Positioning System (GPS) unit 208, and a first auxiliary memory 210. The first electronic device 102 may further include a first memory 212 and a first transceiver 214. The first processor 202, the first I/O device 204, the first imaging unit 206, the GPS unit 208, the first auxiliary memory 210, the first memory 212, and the first transceiver 214 may be communicatively coupled with each other via a system bus.

The first processor 202 may comprise suitable logic, circuitry, interfaces, and/or code that may be configured to execute a set of instruction retrieved from the first memory 212. The first processor 202 may be further configured to synchronize flow of the information and signals between various components of the first electronic device 102. Examples of the first processor 202 may be an X86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a digital signal processor (DSP), a graphics processor unit (GPU), a coprocessor, and/or other processors or integrated circuits.

The first I/O device 204 may comprise suitable logic, circuitry, interfaces, and/or code that may comprise various input and output devices that may be configured to communicate with the first processor 202. The first I/O device 204 may be configured to receive a user input (not shown), via input devices. Examples of the input devices may include, but are not limited to, a camcorder, a touch screen, a keyboard, a mouse, a joystick, a microphone, and/or one or more sensors, such as a motion sensor, a light sensor, a docking station. The first I/O device 204 may be further configured to provide an output to the user, via output devices. Examples of the output devices may include, but are not limited to, a first display screen 204a, a projector screen, and/or a speaker.

The first display screen 204a may be further configured to display application UI, via which the set of images may be captured and user input may be provided. The first display screen 204a may be configured to receive one or more input actions from the one or more users, via a touch-sensitive screen. Such one or more input actions may be received from the one or more users by means of a virtual keypad, a stylus, touch-based input actions, and/or a gesture. The first display screen 204a may be realized through several known technologies such as, but not limited to, Liquid Crystal Display (LCD) display, Light Emitting Diode (LED) display, plasma display, and/or Organic LED (OLED) display technology.

The first imaging unit 206 may comprise suitable logic, circuitry, interfaces, and/or code that may be configured to capture the set of images and/or video associated with one or more items within a field-of-view (FOV) of the first imaging unit 206. The first imaging unit 206 may further generate visual representations of the captured one or more images and/or videos. In accordance with an embodiment, the first imaging unit 206 may be communicatively coupled with the GPS unit 208. The first imaging unit 206 may include a lens assembly and an image sensor that may enable the first imaging unit 206 to capture the one or more images and/or videos. The image sensor of the first imaging unit 206 may be implemented by use of a charge-coupled device (CCD) technology, complementary metal-oxide-semiconductor (CMOS) technology and/or the like.

The GPS unit 208 may comprise suitable logic, circuitry, interfaces, and/or code that may be configured to determine tagging information, such as geospatial metadata associated with the item. The GPS unit 208 may be configured to determine the geospatial metadata associated with the item based on one or more data signals received from GPS satellites. The GPS unit 208 may be operable to perform synchronously with the first imaging unit 206. The GPS unit 208 may be implemented based on different design decisions and approaches to Global Navigation Satellite System (GNSS) solution computation such as, but are not limited to, a Multi-constellation technique, a Multi-frequency technique, an Augmentation techniques and/or Software receivers.

In certain scenarios, the GPS unit 208 may not reserve a clear GPS signal within a building (indoors). In such scenarios, data received from various other indoor location systems may be utilized as input for the first electrode device 102 for indoor positioning of items for the set of information. The indoor location system may include indoor messaging system (IMES), radio frequency (RF) based location system, ultrasound and RF sensors based location system, such as Active badge or Bat, Wi-Fi-based positioning system, and/or indoor positioning systems based on other known technologies, such as decaWave that is based on IEEE 802.15.4-2011. The indoor location system may also include non-wireless technologies, such as magnetic positioning based location detection that employ magnetic variations to detect indoor locations. In accordance with an embodiment, indoor location system that uses multiple-input multiple-output (MIMO)-based techniques to track wireless devices at a fine granularity in real-time or near real-time, may be employed.

In accordance with an embodiment, Wi-Fi access points (APs) may use multiple antennae to augment capacity and coverage with MIMO techniques. Such multiple antennae may be utilized in an indoor scenario for location detection of mobile devices, such as the first electronic device 102.

The first auxiliary memory 210 may comprise suitable logic, circuitry, interfaces, and/or code that may be operable to store the set of images and/or videos of one or more items captured by the first imaging unit 206. The first auxiliary memory 210 may be further configured to store the first set of information extracted by the first processor 202. The first auxiliary memory 210 may be further configured to store the tagging information generated by the GPS unit 208, in conjunction with the first processor 202. The first auxiliary memory 210 may be further configured to store images and/or other information received from an external unit, such as a web server. The first auxiliary memory 210 may comprise a nonvolatile semiconductor memory in which one or more block areas constituting the nonvolatile semiconductor memory may be used to store the one or more images. Examples of the first auxiliary memory 210 may include, but are not limited to, a Hard Disk Drive (HDD), a storage server, a Secure Digital (SD) card, and a flash memory.

The first memory 212 may comprise suitable logic, circuitry, and/or interfaces that may be configured to store a machine code and/or a computer program with at least one code section and/or a set of instructions executable by the first processor 202. Examples of types of the first memory 212 may include, but are not limited to, Random Access Memory (RAM), Dynamic Random Access Memory (DRAM), Static Random Access Memory (SRAM), Thyristor Random Access Memory (T-RAM), Zero-Capacitor Random Access Memory (Z-RAM), Read Only Memory (ROM), Hard Disk Drive (HDD), and/or a Secure Digital (SD) card, and/or cache memory.

The first transceiver 214 may comprise suitable logic, circuitry, interfaces, and/or code that may be configured to transmit/receive information to/from other devices, such as the server 104 and the second electronic device 106, via the communication network 108. The first transceiver 214 may be implemented by technologies known in the art, to support a wired or a wireless communication of the first electronic device 102, with the communication network 108. Various components of the first transceiver 214 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The first transceiver 214 may communicate, via the wireless communication, with networks (such as the Internet and/or Intranet) and/or a wireless network (such as a cellular telephone network, a wireless local area network (LAN) and/or a metropolitan area network (MAN). The wireless communication may use any of a plurality of communication standards, protocols and technologies, such as Global System for Mobile Communications (GSM), Long term evolution (LTE), Enhanced Data GSM Environment (EDGE), wideband code division multiple access (W-CDMA), code division multiple access (CDMA), time division multiple access (TDMA), Bluetooth, Wireless Fidelity (Wi-Fi) (such as as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the first processor 202 may be configured to activate the first imaging unit 206 to capture a set of images associated with an item. The first imaging unit 206 may be activated, in response to a request triggered by a user, such as a first user, based on an action, such as hardware or software button-press action, at the first I/O device 204. In accordance with an embodiment, the captured set of images may comprise, but are not limited to, one or more images of the item and/or an associated location where the item is stored. The first processor 202 may be further configured to receive the captured set of images associated with the item from the first imaging unit 206. In accordance with an embodiment, the first user may further provide a user input for one or more images from the captured set of images. The user input may correspond to additional information associated with the item, such as name of the store from where the medicine is bought.

The first processor 202 may be further configured to generate tagging information for the captured set of images associated with the item. Examples of the tagging information may include, but are not limited to, a date and a time when the set of images is captured, geospatial metadata associated with the item and/or a location where the item is stored, and/or other encoded information associated with the captured set of images. The date and time may be determined by the first processor 202 from internal clocks in the first electronic device 102. The geospatial metadata may be determined by the GPS unit 208, in conjunction with the first processor 202 and the first imaging unit 206. The geospatial metadata associated with the item may comprise geographical co-ordinates of a storage location of the item and/or distance between the user and the item. In accordance with an embodiment, the application UI may further provide one or more access control options, such as "public access", "private access" or "limited access", to the first user. The first user may select one of such options to provide desired level of access control to other devices, such as a second device or a new device, for the first set of information.

Further, the first processor 202 may be configured to extract a first set of information associated with the item from the captured set of images, the tagging information, and the user input. As explained in FIG. 1, the first set of information associated with the item may comprise, but are not limited to, a name of the item, a type of the item, an expiry date of the item, a maximum retail price of the item, one or more ingredients of the item, a manufacturing date of the item, a name of manufacturing company of the item, one or more statutory warnings, instructions for safe usage of the item, a universal product code (UPC), a material safety data sheet (MSDS), and/or other related information of the item retrieved from a plurality of data sources. In accordance with an embodiment, the plurality of data sources may correspond to, but are not limited to, a web server and/or an external memory.

In an instance, the first processor 202 may be configured to execute the computer program stored in the first memory 212 to extract the first set of information. In accordance with an embodiment, the first processor 202 may be configured to communicate the extracted first set of information associated with the item to the server 104, via the first transceiver 214 and the communication network 108. Such communication of the first set of information may be performed, based on one or more commands provided by the user, via an application user interface (UI) rendered at the first display screen 204*a* of the first electronic device 102.

Figure 2B:
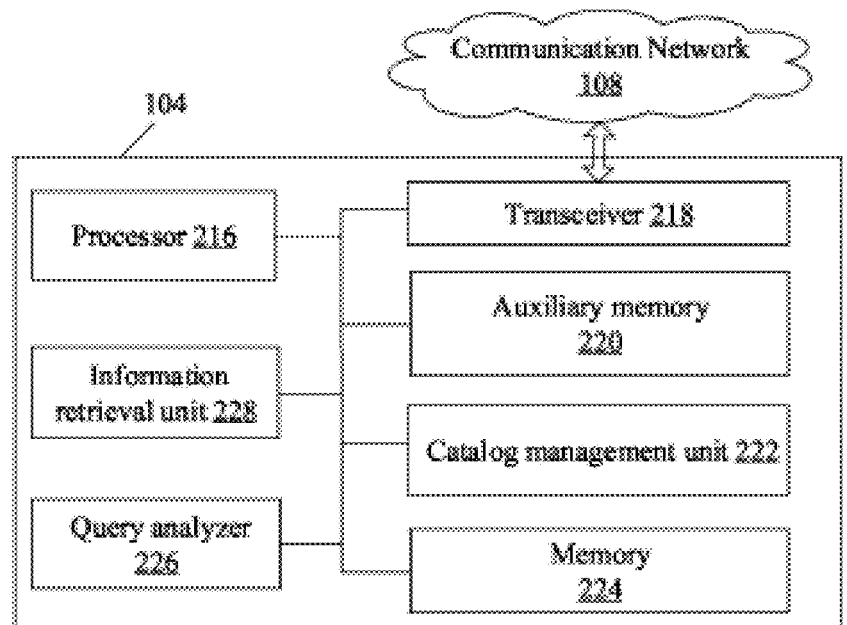
FIG. 2B illustrates second block diagram of an exemplary server for information processing, in accordance with an embodiment of the disclosure.

FIG. 2B illustrates a second block diagram of an exemplary server for information processing, in accordance with an embodiment of the disclosure. With reference to FIG. 2B, there is shown the server 104 that may include a processor 216, a transceiver 218, an auxiliary memory 220, and/or a catalog management unit 222. The sender 104 may further include a memory 224, a query analyzer 226, and/or an information retrieval unit 228.

The processor 216 may comprise suitable logic, circuitry, interfaces, and/or code that may be configured to process information, such as the first set of information received from the first electronic device 102. The processor 216 may be further configured to synchronize flow of information between other components of the server 104. Examples of the processor 216 may be similar to the first processor 202, as described in the FIG. 2A.

The transceiver 218 may comprise suitable logic, circuitry, interfaces, and/or code that may be configured to transmit/receive the information to/from other devices, such as the first electronic device 102 and the second electronic device 106, via the communication network 108, as shown in FIG. 1. The transceiver 218 may be implemented by various technologies known in the art to support wired or wireless communication of the server 104 with the communication network 108. Various components of the transceiver 218 may be similar to the first transceiver 214, as described in FIG. 2A.

The auxiliary memory 220 may comprise suitable logic, circuitry, interfaces, and/or code that may be operable to store the first set of information received from the first electronic device 102, via the communication network 108. The auxiliary memory 220 may be further configured to store a second set of information, determined from the first set of information. The auxiliary memory 220 may be further configured to store other information generated by other components of the server 104. The auxiliary memory 220 may be further to store other information associated with the item that may be received from external units, such as the web server. Examples of the auxiliary memory 220 may be similar to the first auxiliary memory 210, as described in FIG. 2A.

The catalog management unit 222 may comprise suitable logic, circuitry, interfaces, machine code and/or a computer program that may be configured to organize the first and the second set of information associated with the item in the secondary memory, in accordance with a specific data structure and/or data model. The catalog management unit 222 may be implemented based on one or more techniques known in the art.

The memory 224 may comprise suitable logic, circuitry, and/or interfaces that may be configured to store a machine code and/or a computer program with at least one code section executable by the processor 216 Examples of types of the memory 224 may be similar to the first memory 212, as described in FIG. 2A.

The query analyzer 226 may comprise suitable logic, circuitry, interfaces, machine code and/or a computer program that may be configured to analyze the query received from the second electronic device 106, via the transceiver 218 and the communication network 108. In accordance with an embodiment, the query analyzer 226 may be configured to perform semantic analysts on the received query. The semantic analysis may correspond to an interpretation of the query communicated by the second electronic device 106. In accordance with an embodiment, the received query may correspond to various forms such as keywords, images associated with the item, and/or the like.

The information retrieval unit 228 may comprise suitable logic, circuitry, interfaces, and/or code that may be configured to retrieve the received first set of information and the determined second set of information, stored in memory 224. The information retrieval unit 228 may be further configured to retrieve other information pre-stored in the auxiliary memory 220. In accordance with an embodiment, the information retrieval unit 228 may be configured to operate retrieval operate in response to a query received from second electronic device 106, via communication network 108. In accordance with an embodiment, the information retrieval unit 228 may be communicatively coupled with the processor 216, the catalog management unit 222, and/or the query analyzer 226.

In operation, the transceiver 218 may be configured to receive the first set of information associated with the item from the first electronic device 102, via the communication network 108. In accordance with an embodiment, the transceiver 218 may be configured to communicate the received first set of information to the processor 216. The processor 216 may be configured to determine a second set of information from the received first set of information. In accordance with an embodiment, the determination of the second set of information may be based on the other information pre-stored in the auxiliary memory 220. In accordance with an embodiment, the second set of information may include, but are not limited to, time left for expiry of the item, a shelf life of the item, a due date for recycling, quality information of ingredients of the item, and/or a current optimum price value of the item.

The processor 216 may be configured to communicate the received first set of information and/or the determined second set of information to the catalog management unit 222. In accordance with an embodiment, the catalog management unit 222, in conjunction with the processor 216, may be configured to organize the received first set of information and/or determined second set of information in accordance with an data structure and/or a data model, known in the art. In accordance with an exemplary scenario, the catalog management unit 222 may be configured to arrange the received first set of information and the determined second set of information, as shown in Table 1. Table 1 may comprise one or more categories, such as a first category, a second category and/or a third category. The first category may correspond to the user input, the second category may correspond to the first set of information and the third category may correspond to second set of information. Further, each category from the one or more categories may comprise one or more sub-categories. For example, the first category may comprise one or more first sub-categories, such as Unique ID, Image Data, Container Number, Date of Purchase, and Seller Company. The second category may comprise one or more second sub-categories, such as Item Name, Expiry Date, Barcode Number, Weight of Item, Time Stamp, Maximum Retail Price (MRP), and Geospatial Metadata. The third category may include one or more third sub-categories, such as Time left for expiry, Shelf life, Due date for recycling, Current optimum price value, and Quality Information of ingredients.

The processor 216, in conjunction with the catalog management unit 222, may be configured to store the received first set of information and/or the determined second set of information in the auxiliary memory 220. In accordance with an embodiment, the transceiver 218 may be configured to receive a query related to the item from the second electronic device 106 (as shown in FIG. 1), via the communication network 108. The transceiver 218 may be configured to communicate the received query to the query analyzer 226 and the processor 216. The query analyzer 226 may be configured to parse and analyze the received query, in accordance with methods known in the art. Based on the analysis of the received query, the information retrieval unit 228, in conjunction with the processor 216, may be configured to retrieve information from the auxiliary memory 220. The information may correspond to the first set of information and/or the second set of information stored in the auxiliary memory 220. In accordance with an embodiment, the processor 216 may be configured to communicate the retrieved first set of information and/or the second set of information to the second electronic device 106, via the transceiver 218 and the communication network 108.

Figure 2C:
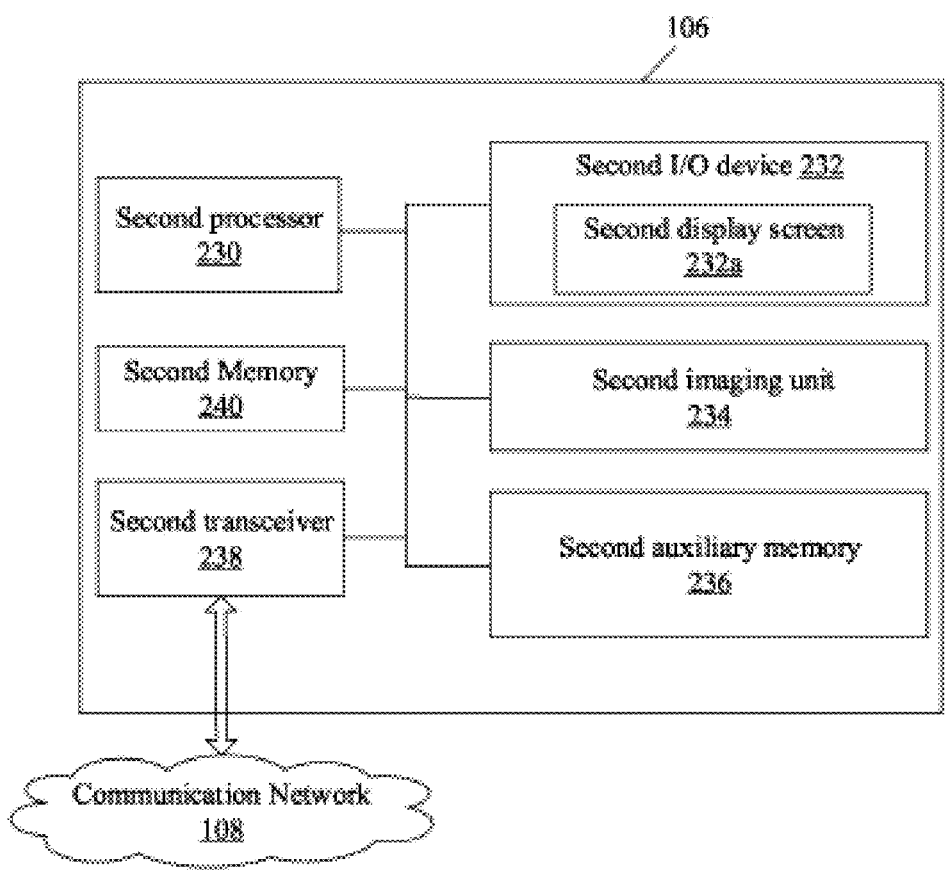
FIG. 2C illustrates third block diagram of an exemplary second electronic device for information processing, in accordance with an embodiment of the disclosure.

FIG. 2C illustrates a block diagram of an exemplary second electronic device for information processing, in accordance with an embodiment of the disclosure. With reference to FIG. 2C, there is shown the second electronic device 106 that may include a second processor 230, a second I/O device 232, a second imaging unit 234, and/or a second auxiliary memory 236. The second electronic device 106 may further include a second transceiver 238 and/or a second memory 240.

The second processor 230 may comprise suitable logic, circuitry, interfaces, and/or code that may be configured to generate a query based on an input provided by another user, such as the second user. The input may be provided by the other user, via an application UI rendered at the second I/O device 232. Examples of the second processor 230 may be similar to the first processor 202, as described in the FIG. 2A.

The second I/O device 232 may comprise suitable logic, circuitry, interfaces, and/or code that may comprise various input and output devices that may be configured to communicate with the second processor 230. The second I/O device 232 may be configured to receive the input, via input devices. The second I/O device 232 may be further configured to provide an output, via output devices, such as a second display screen 232a. Examples of the second I/O device 232 may be similar to the first I/O device 204, as described in FIG. 2A.

The second imaging unit 234 may comprise suitable logic, circuitry, interfaces, and/or code that may be configured to capture images associated with the item within a field-of-view (FOV) of the second imaging unit 234.

TABLE 1

| | First Category | | | | | Second Category | | | | | | Third Category | | | |
| --- | --- | --- | --- | --- | --- | --- | --- | --- | --- | --- | --- | --- | --- | --- | --- |
| Unique ID | Image Data | Container Number | Date Of Purchase | Seller Company | Item Name | Expiry Date | Barcode Number | Weight of Item | Time Stamp | Maximum Retail Price (MRP) | Geospatial Metadata | Time left for expiry | Shelf life | Due date for recycling | Current optimum price value | Quality information of ingredients |
| 1. | | | | | | | | | | | | | | | | |
| 2. | | | | | | | | | | | | | | | | |
| 3. | | | | | | | | | | | | | | | | |
| 4. | | | | | | | | | | | | | | | | |
| 5. | | | | | | | | | | | | | | | | |

Examples of the second imaging unit 234 may be similar to the first imaging unit 206, as described in FIG. 2A.

The second auxiliary memory 236 may compose suitable logic, circuitry, interfaces, and/or code that may be operable to store the first set of information and/the second set of information associated with the item. The second auxiliary memory 236 may be further configured to store other information generated by various units of the second electronic device 106. In accordance with an embodiment, the various units may include the second processor 230, the second I/O device 232, and/or the second imaging unit 234. Examples of types of the second auxiliary memory 236 may be similar to the first auxiliary memory 210, as described in FIG. 2A.

The second transceiver 238 may comprise suitable logic, circuitry, interfaces, and/or code that may be configured to transmit as well as receive the information to/from other units of the second electronic device 106. The second transceiver 238 may be implemented by technologies known in the art to support wired or wireless communication of the server 104, with the communication network 108. Various components of the second transceiver 238 may be similar to the first transceiver 214, as described in FIG. 2A.

The second memory 240 may comprise suitable logic, circuitry, and/or interfaces that may be configured to store a machine code and/or a computer program with at least one code section executable by the second processor 230. In accordance with an embodiment, the second memory 240 may be further configured to store the other information (associated with the item) received from an external server, such as a web server. Examples of the second memory 240 may be similar to the first memory 212, as described in FIG. 2A.

In operation, the second processor 230 may be configured to generate a query, based on an input received from the other user, such as a second user, via the second I/O device 232. In an instance, the second processor 230 may be configured to generate a query based on an image associated with the item captured by second imaging unit 234. In another instance, the second processor 230 may be further configured to generate the query associated with the item based on the keywords provided by the other user.

In accordance with an embodiment, the second processor 230 may be further configured to transmit the generated query to the server 104, via the second transceiver 238 and the communication network 108. In response to the transmitted query, the second processor 230 may be configured to receive the first set of information and/or the second set of information from the server 104, via the second transceiver 238 and the communication network 108. In accordance with an embodiment, the second processor 230 may be further configured to store the received first set of information and/or the second set of information in the second auxiliary memory 236.

Figure 3A:
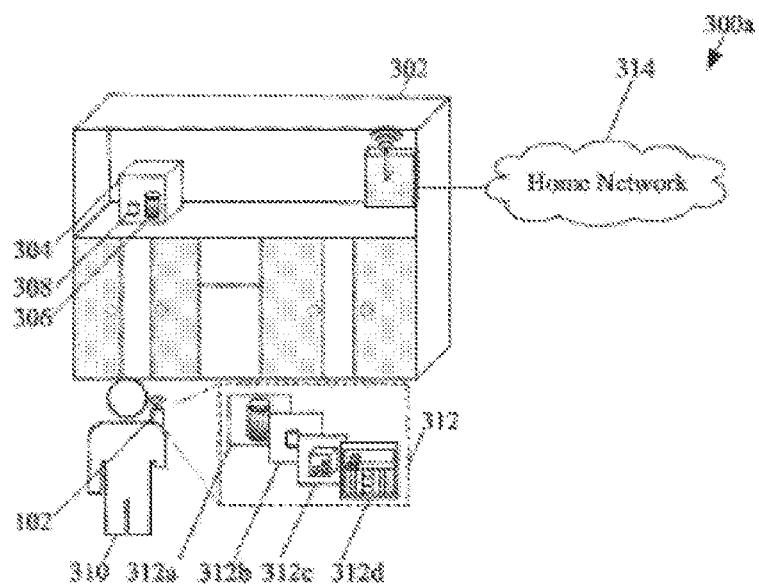
FIGS. 3A, 3B, 3C, and 3D collectively, illustrate an exemplary scenario for implementing the disclosed exemplary system and method for information processing and, in accordance with an embodiment of the disclosure.
Figure 3B:
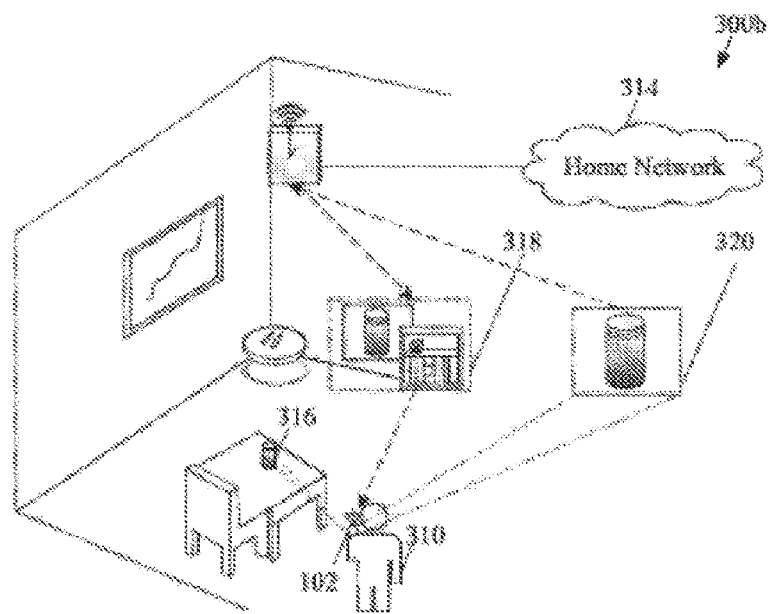
Figure 3C:
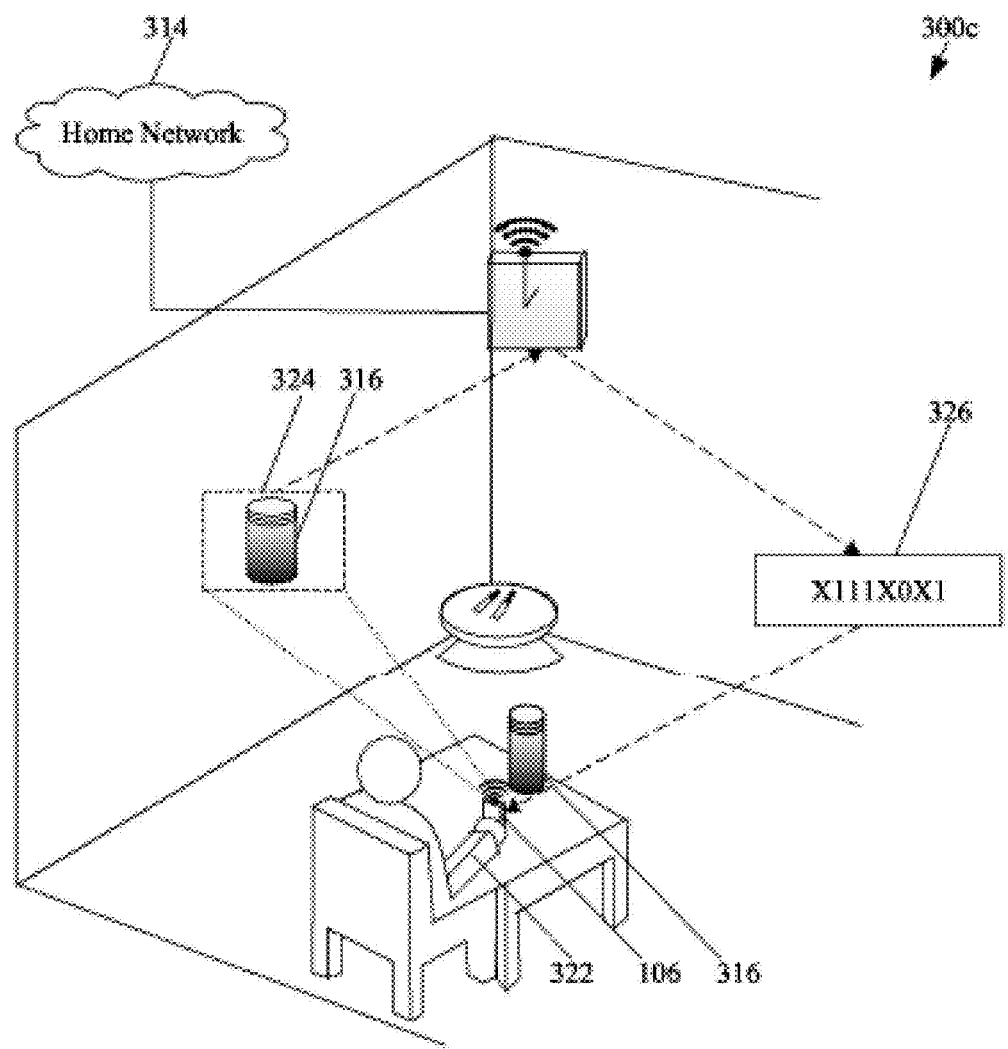

FIGS. 3A, 3B, 3C, and 3D collectively illustrate an exemplary scenario for implementation of the disclosed exemplary system and method for information processing, in accordance with an embodiment of the disclosure. FIGS. 3A, 3B, and 3C are explained in conjunction with elements from FIG. 1 and FIG. 2A to 2C. With reference to FIG. 3A, there is shown a first room 300a. The first room 300a may include a shelf enclosure 302, a container 304, a first item 306, a second item 308, a first user 310, a set of images 312, a home network 314. There is shown the first electronic device 102 (as described in FIG. 1) associated with the first user 310. The container 304 may be placed on the shelf enclosure 302. The container 304 may comprise one or more items, such as the first item 306 and the second item 308. There is further shown a set of images 312 captured by the first electronic device 102, via a pre-installed application UI. The set of images 312 may include one or more images, such as a first image 312a, a second image 312b, a third image 312c, and/or a fourth image 312d. The first image 312a, the second image 312b, the third image 312c, and the fourth image 312d may correspond to the first item 306, the second item 308, the container 304, and the shelf enclosure 302, respectively.

With reference to FIG. 3A, by use of the first electronic device 102, the first user 310 may capture the set of images 312 associated with the one or more items, such as the first item 306 and/or the second item 308. For example, the first user 310 may capture the first image 312a and/or the second image 312b of the first item 306 and/or the second item 308, respectively, that are intended to be kept in the container 304 at the shelf encounter 302. The first user 310 may further capture the third image 312c and the fourth image 312d of and the container 304 and the shelf enclosure 302, respectively, where the first user 310 wants to keep the first item 306 and/or the second item 308. The first user 310 may capture the set of images 312, via an application UI rendered at the first electronic device 102. Once captured, various image, object, and/or text recognition applications installed in the first electronic device 102 may extract the name, composition, manufacturing date, expiry date, and/or statutory warnings of the one or more items.

The first user 310 may further provide a specific user input for each image of the captured set of images 312, via the application UI. Such specific user input may correspond to information associated with the one or more items. The application UI may be provide various graphical elements, such as text boxes, to receive user input, such as seller name, and/or date of purchase of the one or more items. For example, for the first image 312a of the first item 306, such as a varnish tin pack, the first user 310 may provide a user input "xyz general store" from where it is bought, and "Dec. 10, 2015" as the date of purchase.

The first electronic device 102 may be further configured to generate tagging information for the captured set of images 312 associated with the first item 306 and/or the second item 308. For example, the tagging information may include date and/or time when the set of images 312 is captured. The tagging information may further include geo-spatial metadata associated with the first item 306, the second item 308, the container 304 in which the first item 306 and/or the second item 308 are stored, and/or the shelf enclosure 302 where the container 304 is kept. The geospatial metadata associated with the first item 306, the second item 308, the container 304, and/or the shelf enclosure 302 may be determined by known methods in the art, such as a triangulation technique.

In accordance with an embodiment, the first electronic device 102 may be configured to extract a first set of information associated with the first item 306 and/or the second item 308 from the captured set of images 312. The extraction of the first set of information may be based on one or more of image, object, and/or text recognition techniques. Accordingly, the first electronic device 102 may determine the name, type, and expiry date of the first item 306 and/or the second item 308. In accordance with an embodiment, the first set of information may further include the user input and the tagging information. In accordance with an embodiment, the application UI may further provide one or more access control options, such as "public access", "private access" or "limited access", to the first user 310. The first user 310 may select one of such options to provide desired level of access control to other devices, such as a second device or a new device, for the first set of information.

The first electronic device 102 may be further configured to communicate the extracted list set of information to the server 104, via the home network 314. Such communication of the first set of information may be performed, based on one or more commands, such as voice commands, provided by the first user 310. Such one or more commands may be provided by the first user 310, via the application UI rendered at the first display screen 204a of the first electronic device 102. The server 104 may be further configured to determine a second set of information for the one or more items, based on the received first set of information. For example, the server 104 may determine shelf life of the first item 308 and the second item 308, based on the manufacturing dates and the expiry dates included in the first set of information. Such a determination may be based on various known art techniques, such as inferential techniques, stored at the server 104. The server 104 may be further configured to store the received first set of information and the determined second set of information in the auxiliary memory 220.

With reference to FIG. 3B, there is shown a second room 300b, the first user 310 with the first electronic device 102 (as described in FIG. 3A), and a new item 316 placed on a table. There is further shown the home network 314, a first query 318 and a corresponding first response 320. With reference to FIG. 3B, in an exemplary situation, the first user 310, with the first electronic device 102, may be in the second room 300b. The first user 310 may have forgotten the location where the first item 306 was kept in past. Or in other words, the first user 310 may be unable to recall the actual location where the first item 306 was stored. In such a case, the first user 310 may provide the text-based first query, depicted by the first query 318 in FIG. 3B, via the application UI at the first electronic device 102. The text-based first query may include identification details, such as name, color, and/or dimensions, of the first item 306. Thereafter, the first user 310 may select one or more output options provided at the application UI to indicate the type of response that the first user 310 wants to receive from the server 104. For example, the first user 310 may select an output option, "Location of the <<first item 306>>", as a part of the text-based query. The first electronic device 102 may communicate the text-based first query to the server 104, via the home network 314.

In response to the text-based first query, the server 104 may identify the first item 306, based on first and/or second set of information pre-stored in the auxiliary memory 220, (as described in FIG. 3A). The server 104 may retrieve required information, such as geospatial metadata of the first item 306, the container 304, and/or the shelf enclosure 302, associated with the first item 306, based on the output option selected by the first user 310. The server 104 may further transmit the retrieved information back to the first electronic device 102 as the first response 320. Accordingly, the first user 310 may be informed about the current location of the first item 306. The retrieved information may be communicated to the first user 310 in a visual and/or an audio mode, via the first I/O device 204. For example, the retrieved information may be communicated to the first user 310 in the visual mode, via the first display screen 204a. In another example, the retrieved information may be communicated to the first user 310 in the audio mode, via the speakers of the first electronic device 102. In accordance with an embodiment, the first electronic device 102 may navigate the first user 310 to the actual location based on the current location of the first electronic device 102 and the retrieved location of the second item 308. The first electronic device 102 may include a navigation application, known in the art to provide such a navigation facility.

In another exemplary situation, the first user 310 may desire to keep the new item 316 (visually similar to the first item 306) at a location where the first item 306 is stored (with reference to FIG. 3A). Or the first user 310 may desire to know the location of the first item 306, by use of the new item 316 (as the new item 316 is visually similar to the first item 306). In such a case, the first user 310 may capture an image of the new item 316. Based on the captured image, an image-based first query may be generated, via the application UI at the first electronic device 102. Thereafter, the first user 310 may select one or more output options, via the application UI. For example, the first user 310 may select an output option, "Location of similar item", when the first user 310 may desire to keep the new item 316 at a location where the first item 306 is kept or may desire to know the location where the first item 306 is kept. The first electronic device 102 may communicate the image-based first query to the server 104, via the home network 314.

In response to the image-based first query, the server 104 may identify the first item 306, based on first and/or second set of information, pre-stored in the auxiliary memory 220. The server 104 may retrieve required information, such as geospatial metadata of the first item 306, the container 304, and/or the shelf enclosure 302, associated with the first item 306 based on the output option selected by the first user 310. The server 104 may further transmit the retrieved information back to the first electronic device 102 as the first response 320. Accordingly, the first user 310 may be informed about the current location of the first item 306. The retrieved information may be communicated to the first user 310 in a visual and/or an audio mode, via the first I/O device 204, as described in FIG. 3A.

With reference to FIG. 3C, there is shown a third room 300c, a second user 322, such as an insurance agent, with the second electronic device 106. There is further shown a table on which the new item 316 is placed which is visually similar to the first item 304. There is further shown a second query 324 and a second response 326. A person with ordinary skill in the art will understand that an application UI, similar to the one installed at the first electronic device 102, may be pre-installed at the second electronic device 106.

In accordance with a first situation, the first user 310 may want to submit an insurance claim for a physical damage of the first item 306. In accordance with a second situation, the first user 310 may submit an insurance claim for a specific insurance amount for a lost item, such as the first item 306, which was once stored in the container 304 at the shelf enclosure 302 in the first room 300a. The second user 322 may want to determine the eligibility of such an insurance claim.

In response to the submitted insurance claim, the second user 322 may want to know the date of purchase and original price of the first item 306. In accordance with the first situation, the second user 322 may capture an image of the new item 316, similar to the first item 306, placed on the table, via the second electronic device 106. Based on the captured image, an image-based second query, depicted as the second query 324 in FIG. 3C, may be generated, via the application UI at the second electronic device 106. In accordance with the second situation, the second user 322 may manually provide the details of the first item 306, via the applicator UI at the second electronic device 106. Based on such details, a text-based second query, depicted as the second query 324 in FIG. 3C, may be generated.

Thereafter, the second user 322 may select one or more output options, via the application UI. For example, the second user 322 may select an output option, such as "Date of purchase, Insured amount, and Original price of the <<first item 306>>". The second electronic device 106 may communicate the image-based or text-based second query 324 to the server 104, via the home network 314.

In response to the image-based or text-based second query 324, the server 104 may identify the first item 306, based on first and/or second set of information pre-stored in the auxiliary memory 220. The server 104 may retrieve required information, such as date of purchase of the first item 306, insured amount of the first item 306, and the original price of the first item 306. The server 104 may further transmit the retrieved information back to the second electronic device 106 as the second response 326. Accordingly, the second user 322 may be informed about the date of purchase of the first item 306, insured amount of the first item 306, and the original price of the first item 306. The retrieved information may be communicated to the first user 310 in a visual and/or an audio mode, via the second I/O device 232. Thus, based on the received second response 326, the second user 322, such as the insurance agent, may be able to determine eligibility of the insurance claim for the first item 306, submitted by the first user 310.

Figure 3D:
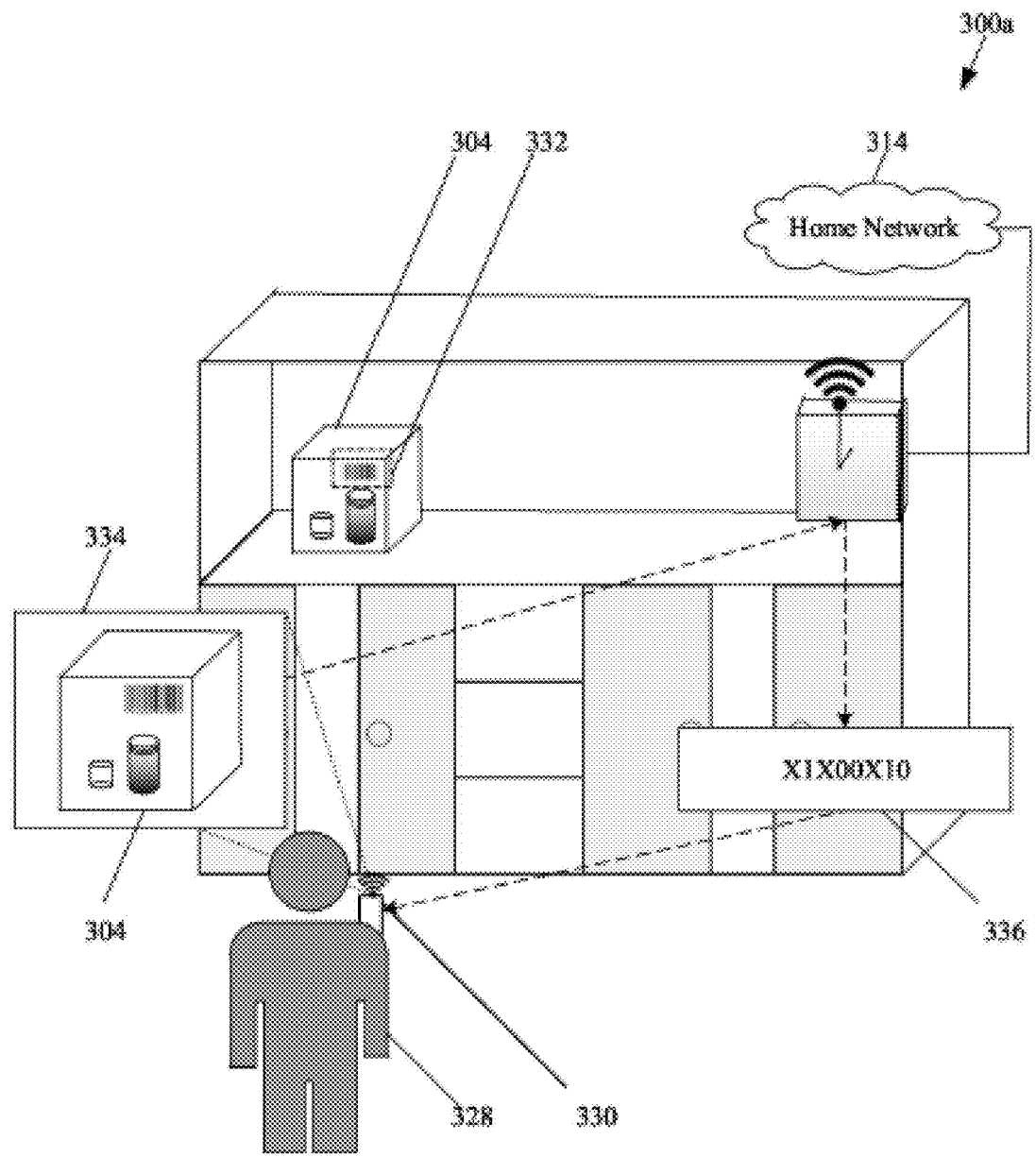

With reference to FIG. 3D, there is shown the container 304 in a third room 300c, a third user 328, such as an income tax officer, with a third electronic device 330. The container 304 may be sealed provided with an identity tag 332, such as a barcode. The container 304 that may comprise one or more items, such as the first item 306 and the second item 308 (as described in FIG. 3A). There is further shown a third query 334 and a third response 336. It may be assumed that the third user 328 is new to the home network 314.

In accordance with an exemplary situation, the first user 310 may desire to donate the container 304 to a charitable trust. Further, the first user 310 may desire to file an income tax rebate on the total piece of the one or more items in the container 304. In such a case, the third user 328 may want to know the total of current price values of the one or more items in the container 304.

The home network 314 may prompt the third user 328 to install an application by which the application UI may be rendered at the display screen of the third user 328. Once the application UI is rendered, the third user 328 may capture an image of the container 304 by use of the third electronic device 330, to generate a third query 334. In accordance with an embodiment, the third electronic device 330 may be operated in conjunction with a barcode reader. Further, the third user 328 may provide additional user input (not shown), such as "Calculate total price and tax rebate", via the application UI. Thereafter, the second user 322 may communicate the third query that includes the captured image and the additional input to the server 104, via the home network 314.

In response to the third query, the server 101 may identify the first item 306 and the second item 308 in the container 304, based on the identity tag 332. Accordingly, the server 104 may further retrieve the first and/or second set of information pre-stored in the auxiliary memory 220. The server 104 may determine the third response 336, as required by the third user 328, in conjunction with an external network, such as the Internet. The third response 336 may include total price of the first item 306 and the second item 308 in the container 304 and calculate the tax rebate. The server 104 may further transmit the third response 336 back to the third electronic device 330. Accordingly, the third user 328 may be informed about the total price of the first item 306 and the second item 308 in the container 304 and calculated tax rebate. The third response 336 may be communicated to the third user 328 in a visual and/or an audio mode, via the I/O device. Thus, based on the received third response 336, the third user 328, such as the income tax officer, may be able to determine total price of the one or more items in the container 304 and the tax rebate applicable to the first user 310.

Figure 4A:
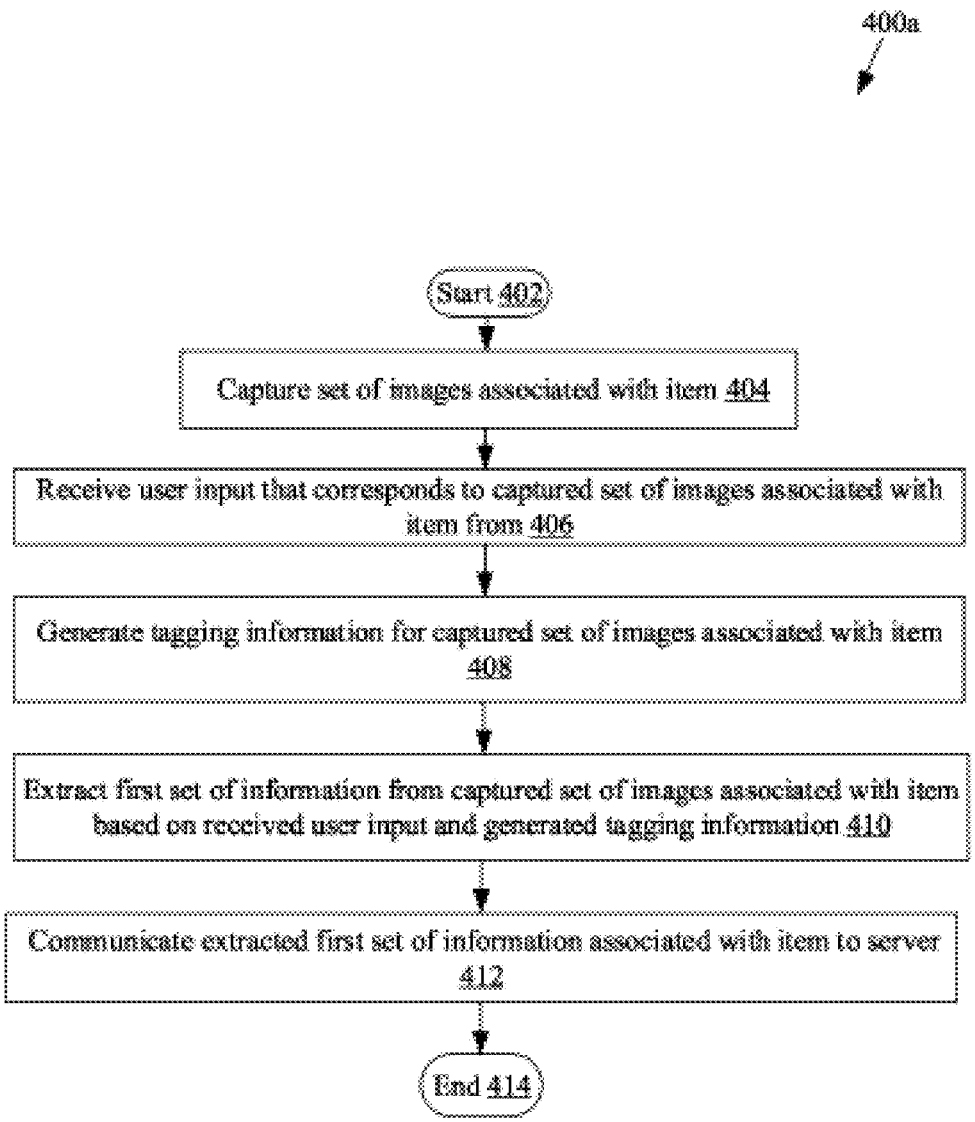
FIG. 4A illustrates a first flow chart for implementation of a first exemplary method for information processing, in accordance with an embodiment of the disclosure.

FIG. 4A illustrates a first flow chart for implementation of a first exemplary method for information processing, in accordance with an embodiment of the disclosure. FIG. 4A is described in conjunction with elements of FIGS. 1, 2A to 2C, and 3A to 3C. The method, in accordance with flowchart 400a in FIG. 4A, may be implemented in the first electronic device 102. With referee to FIG. 4A, the method, in accordance with the flowchart 400a, begins at step 402 and proceeds to step 404.

At step 404, a set of images associated with an item may be captured by the first imaging unit 206. At step 406, a user input that corresponds to the captured set of images associated with the item may be received, via the first I/O device 204. At step 408, tagging information may be generated for each image from the received set of images by the first processor 202. In accordance with an embodiment, the tagging information may correspond to time stamp and geospatial metadata associated with the item. At step 410, a first set of information may be extracted from the captured set of images associated with the item, based on received user input and the generated tagging information. At step 412, the first processor 202 may communicate the extracted first set of information associated with the item to the server 104, via the first transceiver 214 and the communication network 108. Control passes to end step 414.

Figure 4B:
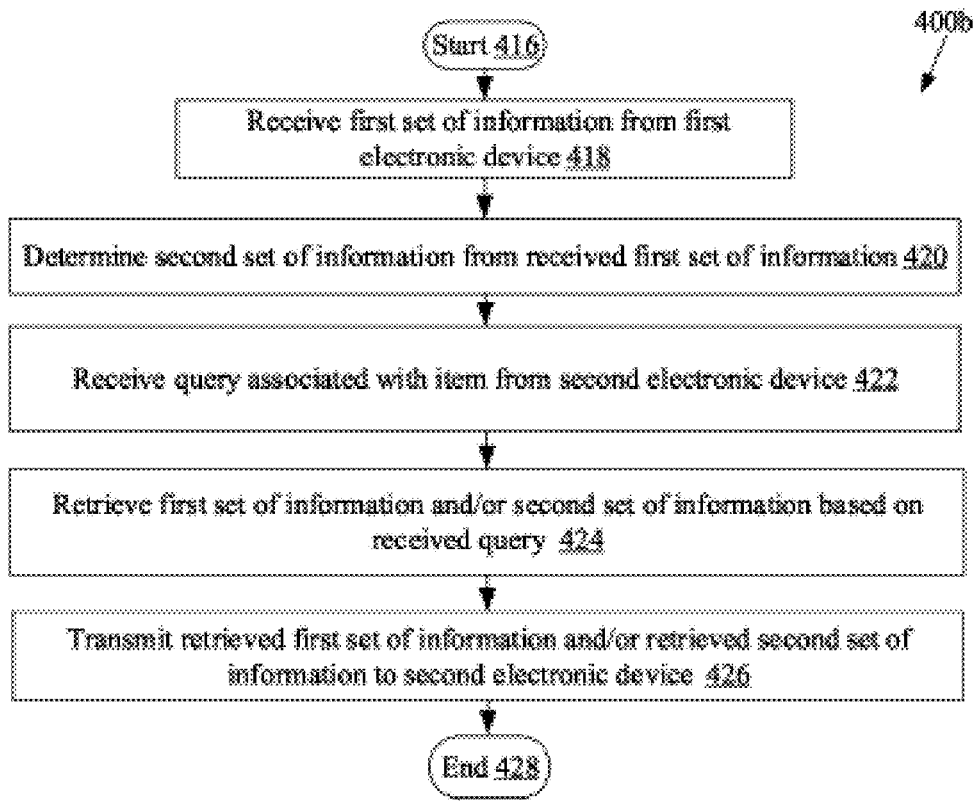
FIG. 4B illustrates a second flow chart for implementation of a second exemplary method for information processing, in accordance with an embodiment of the disclosure.

FIG. 4B illustrates a second flaw chart for implementation of a second exemplary method for information processing, in accordance with an embodiment of the disclosure. FIG. 4B is described in conjunction with elements of FIGS. 1, 2A to 2C, and 3A to 3C. The method, in accordance with flowchart 400b in FIG. 4B, may be implemented in the server 104. With reference to FIG. 4B, the method, in accordance with the flowchart 400b, begins at step 416 and proceeds to step 418.

At step 418, the first set of information associated with the item may be received by the processor 216 from the first electronic device 102, via the transceiver 218 and the communication network 108. At step 420, a second set of information may be determined by the processor 216 from the received first set of information associated with the item. At step 422, the processor 216 may receive a query that corresponds to the item from the second electronic device 106, via the transceiver 218 and the communication network 108. At step 424, the first set of information and/or the second set of information may be retrieved by the processor 216, based on the received query. At step 426, the retrieved first set of information and/or the retrieved second set of information may be transmitted by the processor 216 to the second electronic device 106, via the transceiver 218 and the communication network 108. Control passes to end step 428.

Figure 4C:
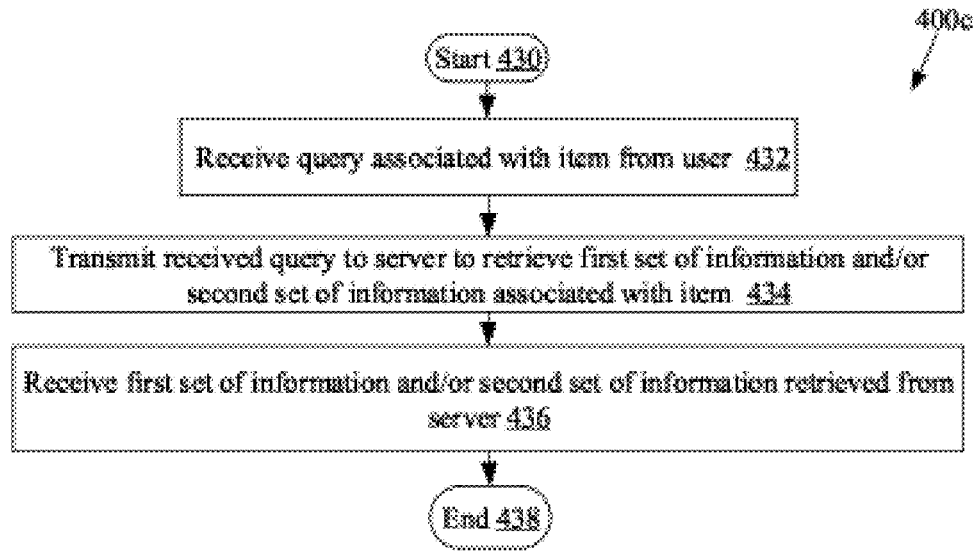
FIG. 4C illustrates a third flow chart for implementation of a third exemplary method for information processing, in accordance with an embodiment of the disclosure.

FIG. 4C illustrates a third flow chart for implementation of a third exemplary method for information processing, in accordance with an embodiment of the disclosure. FIG. 4C is described in conjunction with elements of FIGS. 1, 2A to 2C and 3A to 3C. The method, in accordance with flowchart 400c in FIG. 4C, may be implemented in the second electronic device 106. With reference to FIG. 4C, the method, in accordance with the flowchart 400c, begins at step 430 and proceeds to step 432.

At step 432, the query, provided by a user, may be received at the second electronic device 106. In accordance with an embodiment, the received query may comprise a set of text and/or image based on content associated with the item. At step 434, the received query may be transmitted by the second processor 230 to the server 104, via the second transceiver 238 and the communication network 108. The query may be transmitted to the server 104 for retrieval of the first set of information and/or the second set of information associated with the item. At step 436, the first set of information and/or the second set of information may be received from the server 104 by the second processor 230, via the second transceiver 238 and the communication network 108. Control passes to end step 438.

In accordance with an embodiment of the disclosure, the system for processing information may comprise one or more circuits in the first electronic device 102 (FIG. 2A). The one or more circuits, such as the first processor 202 (FIG. 2A), may capture a set of images, such as the set of images 312 (FIG. 3A) associated with an item, such as the first item 306 and/or the second item 308 (FIG. A). The set of images may comprise one or more images of the item and/or an associated location where the item is stored. The one or more circuits may receive a user input that may correspond to the captured set of images associated with the item. The one or more circuits may extract a first set of information associated with the item from the captured set of images associated with the item. The one or more circuits may further communicate the extracted first set of information associated with the item to the server 104 (FIG. 1). A second set of information associated with the item may be retrieved by the server 104 from the extracted first set of information, in response to a query received from the second electronic device 106 (FIG. 1).

In accordance with an embodiment of the disclosure, another system for processing information may comprise one or more circuits, such as the processor 216 (FIG. 2B), in the server 104. The one or more circuits may be configured to receive a first set of information associated with an item from the first electronic device 102 (FIG. 1). The first set of information may be extracted from a set of images associated with the item captured by the first electronic device 102 and a user input. A second set of information may be determined from the received first set of images associated with the item. A query associated with the item may be received from the second electronic device 106. The first set of information and/or the determined second set of information may be retrieved, based on the received query. The one or more circuits may be configured to transmit the retrieved first set of information and/or the retrieved second set of information to the second electronic device 106.

In accordance with an embodiment of the disclosure, another system for processing information may comprise one or more circuits, such as the second processor 230 (FIG. 2C), in the second electronic device 106. The one or more circuits may receive a query associated with an item. The query may compose text and/or image-based content associated with the item. The received query may be transmitted to the server 104 to retrieve a first set of information and/or a second set of information. The first set of information may be received from the first electronic device 102 and the second set of information is determined by the server 104 from the received first set of information. The retrieved first set of information and/or the retrieved second set of information may be received from the server 104.

Various embodiments of the disclosure may provide a non-transitory, computer readable medium and/or storage medium stored thereon, a machine code and/or a computer program with at least one code section executable by a machine and/or a computer to process data. The at least one code section may cause the machine and/or computer to perform the steps that comprise capturing of a set of images associated with an item. The set of images may comprise one or more images of the item and/or an associated location where the item is stored. A user input that may correspond to the captured set of images associated with the item may be received. A first set of information associated with the item nay be extracted from the captured set of images associated with the item. The extracted first set of information associated with the item may be communicated to the server 104. A second set of information associated with the item may be retrieved by the server 104 from the extracted first set of information, in response to a query received from the second electronic device 106.

Various embodiments of the disclosure may provide a non-transitory, computer readable medium and/or storage medium stored thereon, a machine code and/or a computer program with at least one code section executable by a machine and/or a computer to process data. The at least one code section may cause the machine and/or computer to perform the steps that comprise receipt of a first set of information associated with an item from the first electronic device 102 by the server 104. The first set of information may be extracted from a set of images associated with the item captured by the first electronic device 102 and a user input. A second set of information may be determined from the received first set of information associated with the item. A query associated with the item may be received from the second electronic device 106. The first set of information and/or the determined second set of information may be retrieved, based on the received query. The retrieved first set of information and/or the retrieved second set of information may be transmitted to the second electronic device 106.

Various embodiments of the disclosure may provide a non-transitory, computer readable medium and/or storage medium stored thereon, a machine code and/or a computer program with at least one code section executable by a machine and/or a computer to process data. The at least one code section may cause the machine and/or computer to perform the steps that comprise receipt if a query associated with an item by the second electronic device 106. The query may comprise text and/or image-based content associated with the item. The received query may be transmitted to the server 104 to retrieve a first set of information and/or a second set of information. The first set of information may be received from the first electronic device 102 and the second set of information is determined by the server 104 from the received first set of information. The retrieved first set of information and/or the retrieved second set of information may be received from the server 104.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A system, comprising:
   a first electronic device including at least one circuit, wherein said at least one circuit is configured to:
   capture a set of images associated with an item, wherein said captured set of images comprises at least one image of said item and at least one image of an associated location of storage of said item;
   receive a user input that corresponds to said captured set of images associated with said item;
   generate tagging information for each image of said captured set of images, wherein said generated tagging information comprises a date and a time of said capture of said set of images;
   extract a first set of information associated with said item from said captured set of images, wherein
      said first set of information is extracted based on said generated tagging information for each image of said captured set of images and said received user input, and
      said extracted first set of information corresponds to at least a statutory warning of said item; and
   communicate said extracted first set of information associated with said item to a server, wherein
      a second set of information associated with said item is retrieved by said server from said extracted first set of information based on a query received from a second electronic device, and
      said second set of information corresponds to at least one of a due date for recycle of said item or quality information of ingredients of said item.

2. The system according to claim 1, wherein said generated tagging information further comprises at least one of encoded information associated with said capture of said set of images, or geospatial metadata associated with said item and an enclosure where said item is stored.

3. The system according to claim 1, wherein said received user input corresponds to information related to said item in addition to said extracted first set of information.

4. The system according to claim 1, wherein each of said first electronic device and said second electronic device corresponds to one of a smart phone, a tablet computing device, a barcode reader, or a quick response (QR) reader.

5. A system, comprising:
   a server including at least one circuit, wherein said at least one circuit is configured to:
   receive a first set of information associated with an item from a first electronic device, wherein
      said first set of information is extracted by said first electronic device from a set of images based on tagging information for each image of said set of images and a user input,
      said received first set of information corresponds to at least a statutory warning of said item,
      said set of images is associated with said item,
      said set of images comprises at least one image of said item and at least one image of an associated location of storage of said item,
      said first electronic device captures said set of images and generates said tagging information, and
      said generated tagging information comprises a date and a time of said capture of said set of images;
   determine a second set of information from said received first set of information associated with said item, wherein said second set of information corresponds to at least one of a due date for recycle of said item or quality information of ingredients of said item;
   receive a query associated with said item from a second electronic device; and
   transmit said determined second set of information to said second electronic device, based on said received query.

6. The system according to claim 5, wherein
   said received first set of information further comprises said tagging information for said set of images, and
   said tagging information further comprises at least one of information associated with said capture of said set of images, or geospatial metadata associated with said item and said associated location of storage of said item.

7. The system according to claim 5, wherein said determined second set of information corresponds to at least one of a time left for expiry of said item, a shelf life of said item, or a current price value of said item.

8. A system, comprising:
   a first electronic device including at least one circuit, wherein said at least one circuit is configured to:
   receive a query associated with an item, wherein said received query comprises at least one of text-based content associated with said item or image-based content associated with said item;
   transmit said received query to a server to retrieve a second set of information, wherein
      said server receives a first set of information from a second electronic device,
      said second set of information is determined by said server from said received first set of information,
      said second electronic device extracts said first set of information associated with said item from a set of images,
      said first set of information is extracted based on tagging information for each image of said set of images and a user input, said extracted first set of information corresponds to at least a statutory warning of said item, said set of images comprises at least one image of said item and at least one image of an associated location of storage of said item, said second electronic device captures said set of images and generates said tagging information, and said generated tagging information comprises a date and a time of said capture of said set of images; and receive said determined second set of information from said server based on said transmitted query, wherein said received second set of information corresponds to at least one of a due date for recycle of said item or quality information of ingredients of said item.

9. A system, comprising:

a server including at least one circuit, wherein said at least one circuit is configured to:

receive, from a first electronic device, a first set of information associated with an item, wherein said first set of information corresponds to at least one of sensor data received from said first electronic device or a user input;

determine a second set of information from said received first set of information associated with said item, wherein said second set of information corresponds to at least one of a due date for recycle of said item or quality information of ingredients of said item;

generate a database based on said first set of information and said determined second set of information;

receive, from a second electronic device, a query associated with said item;

retrieve said determined second set of information, from said generated database, based on said received query, wherein said first electronic device extracts said first set of information associated with said item from a set of images, said received first set of information corresponds to at least a statutory warning of said item, said first set of information is extracted based on tagging information for each image of said set of images and said first user input, said set of images is associated with said item, said set of images comprises at least one image of said item and at least one image of an associated location of storage of said item, said first electronic device captures said set of images and generates said tagging information, and said generated tagging information comprises a date and a time of said capture of said set of images; and transmit said retrieved second set of information to said second electronic device.

10. The system according to claim 9, wherein said sensor data received from said first electronic device corresponds to at least one of a location data of said first electronic device obtained from an indoor positioning system, a geospatial sensor, sensors associated with said first electronic device, an orientation data of said first electronic device, or said set of images associated with said item captured by said first electronic device.

11. The system according to claim 9, wherein said at least one circuit is further configured to group said item with at least one of a plurality of items, different from said item, based on a third set of information and said received first set of information, and said third set of information is associated with each item of said plurality of items that is different from said item.

12. A method, comprising:

receiving, at a server, a first set of information associated with an item from a first electronic device, wherein said first set of information is extracted by said first electronic device from a set of images based on tagging information for each image of said set of images and a user input, said received first set of information corresponds to at least a statutory warning of said item, said set of images is associated with said item, said set of images comprises at least one image of said item and at least one image of an associated location of storage of said item, said first electronic device captures said set of images and generates said tagging information, and said generated tagging information comprises a date and a time of said capture of said set of images;

determining, by said server, a second set of information from said received first set of information associated with said item, wherein said second set of information corresponds to at least one of a due date for recycle of said item or quality information of ingredients of said item;

receiving, at said server, a query associated with said item from a second electronic device; and transmitting, by said server, said determined second set of information to said second electronic device based on said received query.

13. The method according to claim 12, wherein said user input corresponds to information related to said item in addition to said extracted first set of information.

14. The method according to claim 12, wherein each of said first electronic device and said second electronic device corresponds to one of a smart phone, a tablet computing device, a barcode reader, or a quick response (QR) reader.

15. The method according to claim 12, wherein said received first set of information further comprises said tagging information for said set of images.

16. The method according to claim 15, wherein said tagging information comprises at least one of, encoded information associated with said capture of said set of images, or geospatial metadata associated with said item and an enclosure where said item is stored.

17. The method according to claim 12, wherein said determined second set of information corresponds to at least one of a time left for expiry of said item, a shelf life of said item, or a current price value of said item.

* * * * *